United States Patent
Katsura et al.

(10) Patent No.: US 6,343,186 B1
(45) Date of Patent: Jan. 29, 2002

(54) LENS-FITTED FILM UNIT

(75) Inventors: Hirofumi Katsura, Kanagawa-Ken; Fuminori Kawamura, Kanagawa-ken, both of (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 31 days.

(21) Appl. No.: 09/597,488

(22) Filed: Jun. 19, 2000

(30) Foreign Application Priority Data

Jun. 18, 1999 (JP) .......................................... 11-171730

(51) Int. Cl.⁷ .............................. G03B 9/02; G03B 17/04
(52) U.S. Cl. ............................... 396/6; 396/63; 396/72; 396/505; 359/739; 359/676
(58) Field of Search ............................... 396/6, 63, 64, 396/72, 535, 505; 359/676, 739, 740, 822, 738

(56) References Cited

U.S. PATENT DOCUMENTS

| | | | |
|---|---|---|---|
| 5,576,793 A | * 11/1996 | Hara et al. ...................... | 396/6 |
| 5,815,738 A | * 9/1998 | Petruchik ........................ | 396/6 |
| 5,842,055 A | * 11/1998 | Tamura ........................... | 396/72 |

FOREIGN PATENT DOCUMENTS

JP 564839 8/1993

* cited by examiner

*Primary Examiner*—Alan A. Mathews
(74) *Attorney, Agent, or Firm*—Young & Thompson

(57) ABSTRACT

A fixed making frame for blocking the peripheral light is disposed between a taking lens aperture and an exposure frame of a film surface. The effective diameter of the taking lens aperture is variable so as to make an angular field of a photogtaphing light which extends from the taking lens aperture to an exposure area. The angular filed is smaller under a larger effective diameter than under a smaller effective diameter. A predetermined width of a periphery of the exposure area defines a non-print area, and the fixed making frame is disposed at a side adjacent to the taking lens aperture with respect to an intersection of the peripheral light which extends between an inner periphery of the non-print area and the lens aperture under a larger effective diameter of the taking lens, and a peripheral exposure light which extends the lens aperture and an outer periphery of the exposure area, under a smaller effective diameter of the taking lens aperture. The making frame is configured to block the photographing light outside the peripheral light which extends between the inner periphery of the non-print area and the taking lens aperture upon increased effective diameter of the taking lens.

7 Claims, 16 Drawing Sheets

LENS-FITTED FILM UNIT

FIELD OF THE INVENTION

This invention relates to lens-fitted film units. Particularly, this invention relates to a lens-fitted film unit wherein an effective aperture diameter of a taking lens can be varied either by moving the taking lens in the direction of an optical axis or by changing an aperture diameter of the taking lens.

BACKGROUND OF THE INVENTION

A lens-fitted film unit, which includes a photographing mechanism containing a taking lens and a shutter and provided with a roll of unexposed film loaded in advance in the main body during the process of manufacture, is disclosed, for example, in Japanese registered utility model publication No.2,564,847. The lens-fitted film unit of this type is so constituted an exposed portion of the film is taken up into the cartridge each time a picture is taken. Users may buy the unit and takes the unit itself to a photo developing shop to have it developed after the film roll has been finished. Therefore, the unit has gained wide market acceptance as a convenient and functional photographing product.

The lens-fitted film unit generally includes a single lens or two-piece lens structure in order to simplify the structure and bring down the cost of manufacture. The taking lens is fixed to the main body and focused on one particular focusing position. Therefore, an out-of-focus condition is avoided by making the depth of focus of the taking lens greater for objects which are not at the focused point. However, in recent years, variety of lens-fitted film units have been developed in respect of picture sizes and focal lengths of the taking lens. Thus, there are demands for products of various functions.

In such diversified lens-fitted film units, it is required to set the focused position of the taking lens accurately in the process of manufacture in case where a taking lens of a large focal distance is adopted it is necessary to adopt a variety of schemes for the lens positioning mechanism. For example, in Japanese laid-open patent publication Hei7-261069, there is disclosed a mechanism adapted to be used during manufacture of a lens-fitted film unit having a telephoto lens for positioning the lens at a precisely focused position and securing the lens at the position. However, even in such a lens-fitted film unit provided with the aforementioned focus setting mechanism, it is not possible to shift the taking lens to a plurality of focusing positions because the lens is fixed to the predetermined position once the focus position is thus determined. Taking such situations into consideration, it is desirable that lens-fitted film units and other cameras of simple structures have a structure which includes a single or two-piece lens structure but nevertheless can be adapted for a plurality of different photographing situations such as a close-up photographing, a normal photographing, and a photographing of distant objects, and can take properly focused pictures. In Japanese laid-open patent publication Hei10-200834, there is proposed a lens-fitted film unit having a taking lens of a short focal distance and capable of taking a photo of a very closely situated object, such as the one located within 60 cm, the unit including a reflex finder adapted to be moved into and out an operative position in front of the unit. In the operative position, the reflex finder makes it possible for a user of the unit to observe the filed of picture from the front side of the unit. Therefore, it is possible for the user to take a picture including himself or herself in the filed of the picture.

Thus, it is the actual circumstance that even in such lens-fitted film units characterized by their simple structure and low price, there are also trends of progressive diversification of their functions. In a lens-fitted film unit including a taking lens of a fixed focal distance, in order to make the focus adjustment position of the taking lens changeable between a normal photographing position and a close-up photographing position, it is necessary to make the taking lens movable in the direction of an optical axis. It is also necessary to make the taking lens movable in the direction of the optical axis where the taking lens is of a type wherein the focal distance can be changed between for example a normal distance and a telephoto distance. In this case, an angular field of a photographing peripheral light which extends between an outer edge of the taking lens aperture and an outer periphery of the exposure area or focal plane of the film is changed when the taking lens is moved between a retarded position and an advanced position. A similar situation is also created when the diameter of the taking lens aperture is adapted to be variable. More specifically, defining the term "effective aperture diameter" as the diameter of the taking lens aperture at a predetermined axial position of the taking lens, the effective aperture diameter is varied in response to a movement of the taking lens in the direction of the optical axis. Similarly, the effective aperture diameter is also varied when the aperture diameter of the taking lens is changed.

On the other hand, since the lens-fitted film unit has to essentially have a photographing function, it is required to provide a making frame for blocking an unnecessary peripheral light in order to prevent so called ghost images and flare spots caused by internal reflection of a harmful light in an optical path which extends from the taking lens aperture to the exposure area on the film surface. In the lens-fitted film unit having an optical system in which the effective diameter is adapted to be variable as described above, it is preferable that the making frame is formed to be adjustable to match with respective peripheral light paths of photographing lights corresponding to each effective aperture diameter. However, such an adjustable structure of the making frame results in increased complexity and cost of the lens-fitted film unit.

SUMMARY OF THE INVENTION

It is an object of the present invention to provide a fixed making frame having a simple structure which can prevent ghost images and flare spots caused by internal reflection of a harmful light and substantially causes no decrease in quantity of a peripheral light, in a lens-fitted film unit having a photographic optical system in which the taking lens is adapted to be movable in the direction of the optical axis so as to change the focus adjustment position or the focal distance of the taking lens, or the diameter of the taking lens aperture is adapted to be variable, to thereby cause a change in the effective aperture diameter of the taking lens.

In order to solve the above mentioned problem, a lens-fitted film unit in accordance with the present invention comprises a taking lens, a photographic lens aperture provided in association with the taking lens and a unit body having a photographing mechanism including a shutter. The unit body is formed with a cartridge chamber for storing a cartridge shell having a rotatable spool provided therein for retaining an end of a photo film strip, and a film roll chamber for storing a roll of unexposed photo film strip withdrawn out of the cartridge shell, wherein the cartridge shell and the roll of an unexposed photo film strip withdrawn out of the cartridge shell are charged in advance during manufacturing in the cartridge chamber and the film roll chamber, respectively. A portion of the unexposed film is adapted to be positioned by an exposure frame which defines an exposure area between the film roll chamber and the cartridge chamber, and a portion of an exposed film is adapted to be taken up into the cartridge shell after each shot of photographing by rotating the spool. Further, a fixed making frame for blocking the peripheral light is disposed between the taking lens aperture and the exposure frame. As a feature of the present invention, the effective diameter of the taking lens aperture is variable to make an angular field of photographing light which extends from the taking lens aperture to an outer periphery of the exposure area is smaller when the effective diameter is large than in the case where the effective diameter is small. In addition, a predetermined width of the peripheral portion of the exposure area defines a non-print area, and the fixed making frame is disposed at a position closer to the taking lens aperture with respect to an intersection between a peripheral light which extends between an inner periphery of the non-print area and the taking lens aperture, under a large effective diameter of the taking lens aperture, and a peripheral exposure light which extends between the taking lens aperture and an outer periphery of the exposure area, under a small effective diameter of the taking lens. The making frame is of a size to partially or fully block the photographing light outside the peripheral light, which extends between the inner periphery of the non-print area and the taking lens aperture under a large effective diameter of the taking lens.

In the effective diameter of the taking lens aperture may be changed by a movement of the taking lens in the direction of the optical axis. In this case, the taking lens may be of a fixed focal distance type, wherein the movement of the taking lens in the direction of the optical axis cause a change in the focus adjustment position. Alternatively, the taking lens may be of a variable focal distance type, and the movement of the taking lens in the direction of the optical axis may be adapted to change a focal distance. Further, the effective diameter of the taking lens aperture may also be varied by changing the aperture diameter of the taking lens.

In another aspect of the present invention, a lens-fitted film unit comprises a taking lens of a fixed focal distance type, a lens aperture of a fixed aperture diameter, provided in association with the taking lens and a unit body having a photographing mechanism including a shutter. The unit body is formed with a cartridge chamber for storing a cartridge shell having a rotatable spool provided therein for retaining an end of a photo film strip, and a film roll chamber for storing a roll of unexposed photo film strip withdrawn out of the cartridge shell. Then, the cartridge shell and the roll of an unexposed photo film strip withdrawn out of the cartridge shell are charged in advance during manufacturing in the cartridge chamber and the film roll chamber, respectively. The unexposed film portion is adapted to be positioned between the film roll chamber and the cartridge chamber by an exposure frame which defines an exposure area therebetween and an exposed film portion is adapted to be taken up into the cartridge shell after each shot of photographing by rotating the spool. Further, a fixed making frame for blocking the peripheral light is disposed between the taking lens aperture and the exposure frame. In this aspect of the present invention, a taking lens is adapted to be movable in the direction of the optical axis for changing the a focus adjustment position, so that an angular field of a photographing light which extends from a taking lens aperture to an outer periphery of the exposure area is smaller when the taking lens is in an advanced position than, in a case wherein the taking lens is in a retracted position. A predetermined width of the peripheral portion of-the exposure area defines a non-print area, and the fixed making frame is disposed at a position closer to the taking lens aperture with respect to an intersection between a peripheral light which extends between an inner periphery of the non-print area and the taking lens aperture in the advanced position of the taking lens, and a peripheral exposure light which extends between the taking lens aperture and an outer periphery of the exposure area in the retraced position of the taking lens. The making frame is of a size to partially or fully block the photographing light outside the peripheral light which extends between the inner periphery of the non-print area and the taking lens aperture in the advanced position of the taking lens.

In a lens-fitted film unit according to the present invention, when the optical system is switched to the position where the effective diameter of the taking lens aperture becomes larger, the light which reaches the non-print area on the periphery of the exposure area among a photographing light under the large effective diameter of the taking lens aperture is partly blocked by the making frame causing a decrease in quantity of light in the periphery of the exposure area. However, it substantially causes no problem because this portion can usually be cut off from the photograph at a printing process.

When the optical system is switched to a position where the effective diameter of the taking lens aperture becomes smaller, a light outside a line which extends between the taking lens aperture and the peripheral portion of the exposure area under the small effective diameter of the taking lens aperture is passed through the making frame. However, the quantity of light can be reduced compared with the case where the size of the making frame is defined to pass the photographing light which reaches the peripheral portion of the exposure area under the large effective diameter of a taking lens aperture.

Therefore, in the condition that the optical system is switched to the position where the effective diameter of a taking lens aperture becomes smaller, only petty quantity of light can be passed through the making frame and reach the portion outside of the exposure area. Thus, there is substantially no problem of ghosts or flares.

Further, a second making frame may, if required, be provided at a position closer to the film surface with respect to the intersection of the lights described above. In the condition that the optical system is switched to a position where the effective diameter of a taking lens aperture becomes smaller, a harmful light can be completely blocked by setting the size of the second making frame capable of blocking a light outside the photographing light path which extends the taking lens aperture and the peripheral portion of the exposure area.

DESCRIPTION OF THE PREFERRED EMBODIMENT

Figure 1:
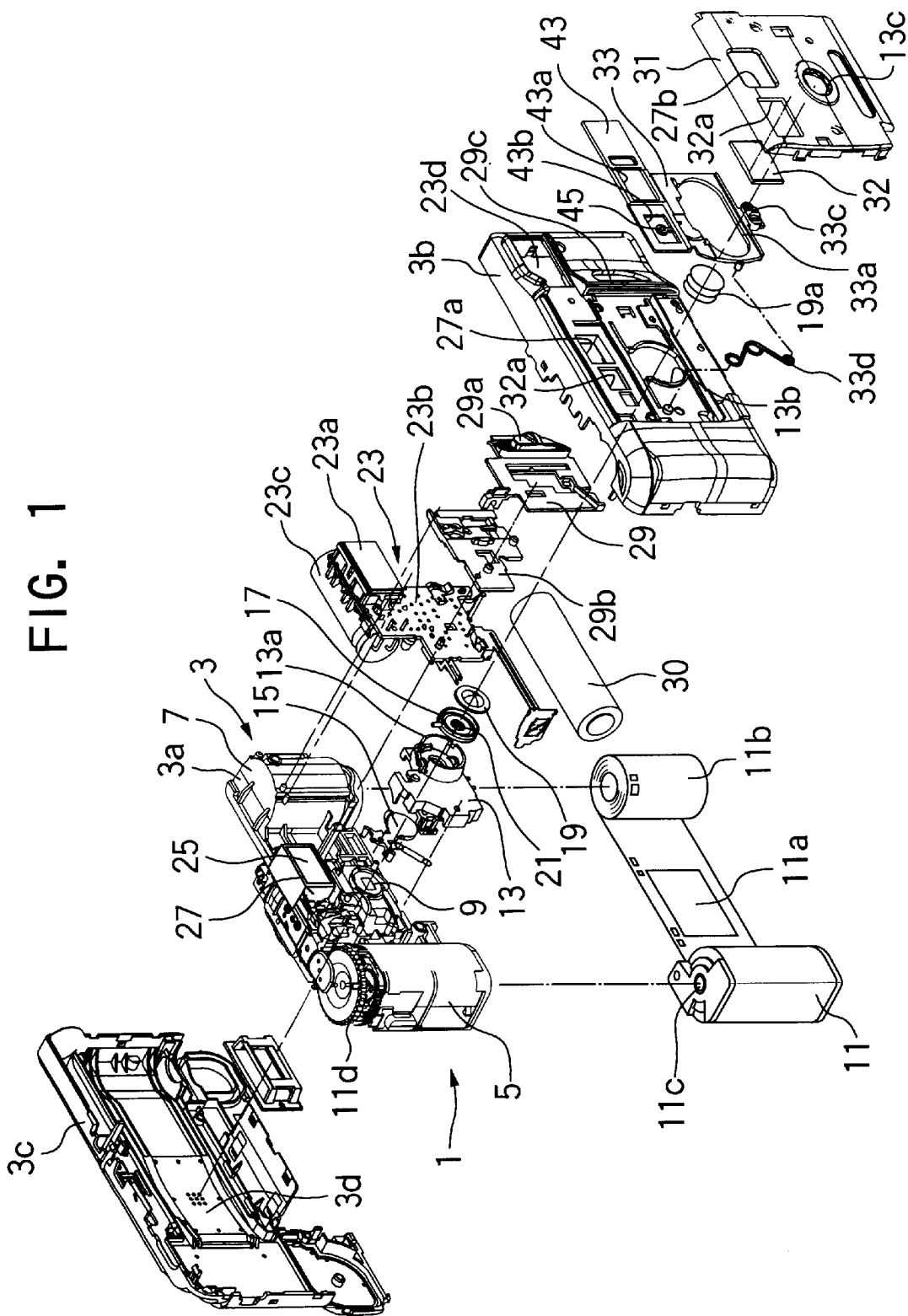
FIG. 1 is an exploded perspective view illustrating a lens-fitted film unit in it's entirety embodying the present invention.
Figure 2:
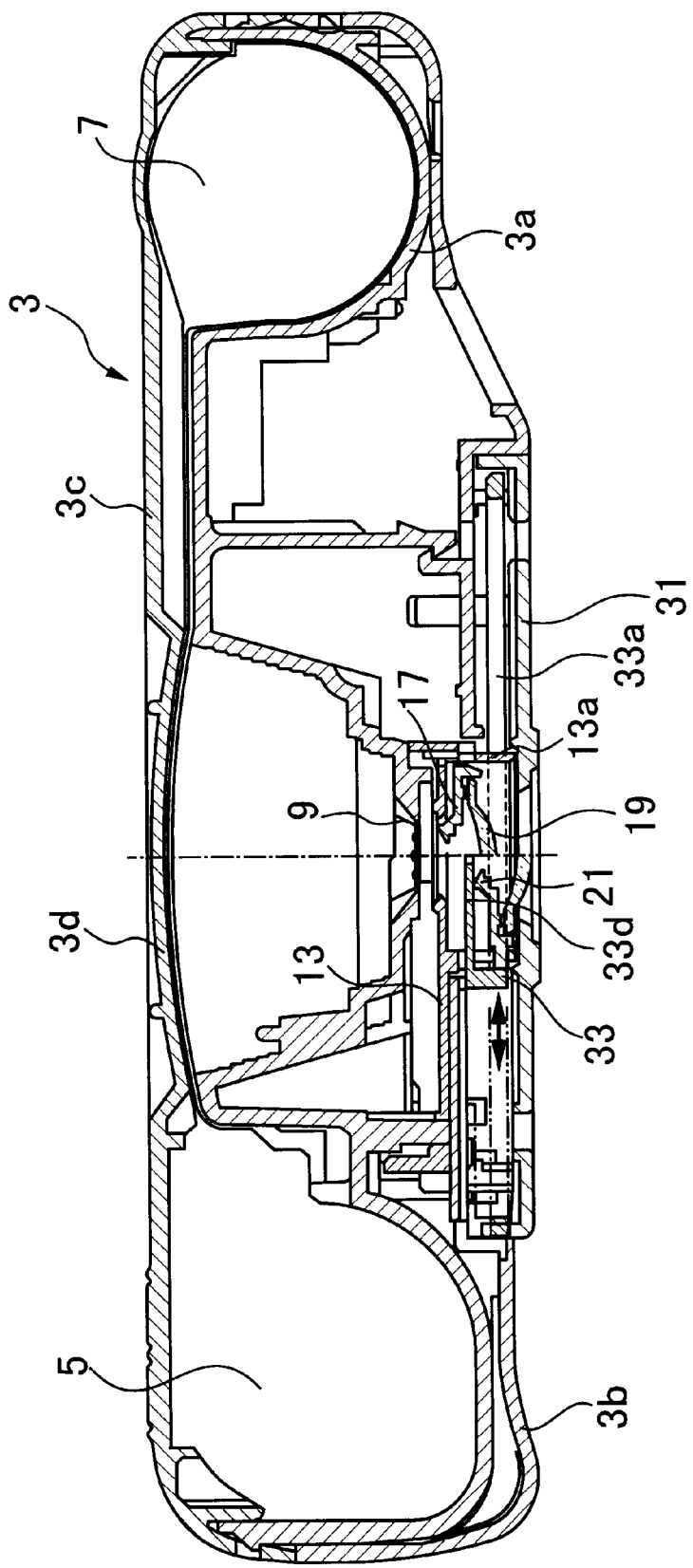
FIG. 2 is a horizontal sectional view of the lens-fitted film unit illustrated in FIG. 1.

FIG. 1 is an exploded perspective view of a lens-fitted film unit 1, showing an embodiment of the present invention. The lens-fitted film unit 1 is provided with a unit body 3 comprising a body portion 3a, a front cover 3b, and a rear cover 3c. As shown in FIG. 2, between the body portion 3a and the rear cover 3c, there is defined a cartridge chamber 5 and film roll chamber 7 at the opposite end portions, respectively. In the central portion of the body portion 3a, an exposure aperture 9 is formed. During the manufacturing process of the lens-fitted film unit 1, a roll of photo film in a cartridge shell 11 is prepared, unexposed film 11a is withdrawn out, and a film roll 11b is formed. The unexposed film 11a is secured at an end adjacent to the cartridge to a spool 11c provided in the cartridge shell 11 to rotate freely.

The cartridge shell 11 is stored in the cartridge chamber 5 and the film roll 11b in the film roll chamber 7. Thereafter, the rear cover 3c is attached to the back side of the body portion 3a, and secured thereto light-tightly. In an alternative form, the film roll chamber 7 may be provided with a reel (not shown). A cartridge shell 11 may then be charged in the cartridge chamber 5 and the leader of the unexposed film 11 is attached to the reel. After the rear cover 3c is closed and the unit body 3 is thus assembled, the reel is driven to pull the unexposed film 11a out of the cartridge shell 11 and wind it thereon. Inside the rear cover 3c, at a position corresponding to the rear side of the exposure aperture, a film holder 3d is provided, and the unexposed film 11a extending between the cartridge shell 11 and film roll 11b is held between the film holder 3d and a film support 3e formed in the backside of body portion 3a.

In front of the body portion 3a, there is provided and fixed thereto a lens holder 13 having a cylindrical lens holding member 13a. The cylindrical lens holding member 13a is axially aligned with the exposure aperture 9 formed on the body portion 3a. Between the lens holder 13 and the body portion 3a, there is provided a sector blade 15 constituting a shutter mechanism. The shutter apparatus having the sector blade 15 is charged by a taking up operation of the unexposed film 11a, and released by depressing the release button provided on the upper side of the unit body 3. The shutter apparatus and its actuating mechanism is well known in the field of lens-fitted film units, so that a detailed description will not be made. In order to take up the film into the cartridge shell 11, a film taking-up knob 11d is rotatably provided above the cartridge chamber 5 on the upper side of body portion 3a, and the film taking-up knob 11d is connected to the spool 11c of the cartridge shell 11.

The lens holding member 13a is of a cylindrical configuration, and formed integrally with the lens holder 13 with plastic material. In the cylindrical lens holding member 13a, a lens holding frame 17 is located for rotation and axial movement. To the lens holding frame 17, a taking lens 19 is fixed. The taking lens 19 is a single-piece lens or a two-piece lens structure of a fixed focal distance. In the lens holding frame 17, a taking lens aperture 21 is provided in back of the taking lens 19. In the present example, the taking lens 19 is of a regular type wherein the focal distance is about 30 mm in terms of 135 film, and a taking lens aperture 21 has the f-number of nearly F10 for regular photographing.

The lens-fitted film unit 1 in the embodiment illustrated is of a type having a built-in flash unit. The flash unit 23 is provided with a light emitting portion 23a, a printed circuit board 23b containing a control circuit to control the flashing from the light emitting portion 23a, and a capacitor 23c. The light emitting portion 23a and capacitor 23c are supported on the printed circuit board 23b. Above the exposure aperture 9 in the body portion 3a, there is formed a finder window 27 having a finder objective lens fitted thereto, and the printed circuit board 23b is fixed to the body portion 3a with the light emitting portion 23a located light side of the finder window 27 as seen from the front side of the body portion 3a.

Figure 3:
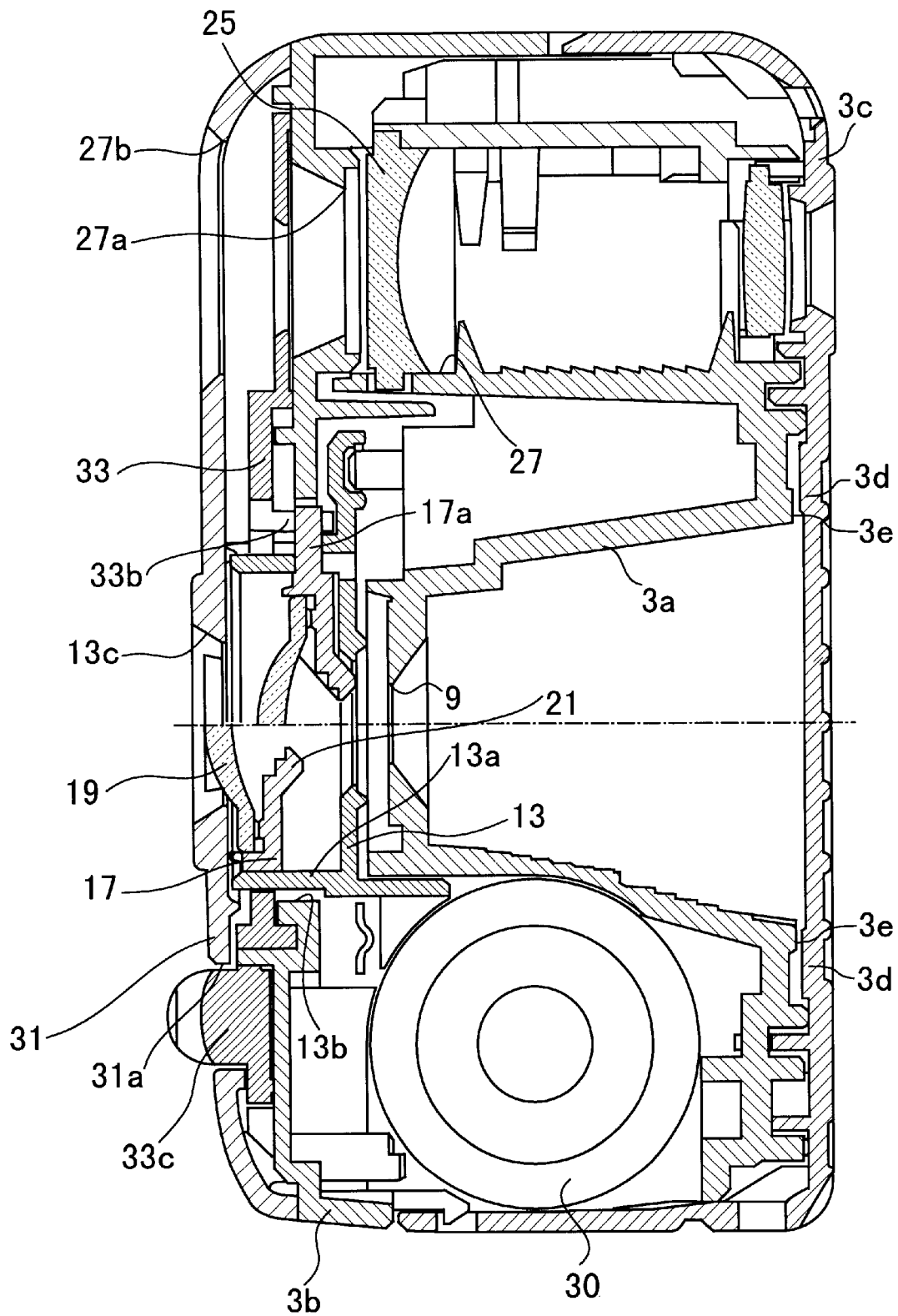
FIG. 3 is a vertical sectional view of the lens-fitted film unit illustrated in FIG. 1.

In front of the printed circuit board 23b on the flash unit 23, there is disposed a switch board 29. The switch board 29 is located on the printed circuit board 23b with a support board 29b disposed therebetween. The switch board 29 is able to move slidably up and down, and has a switch knob 29a formed integrally thereto. Thus, by setting the switch knob 29a to the charging position, the capacitor 23c of the flash unit 23 is charged. The capacitor charging battery 30 is stored, as shown in FIG. 3, in the bottom of the body portion 3 as well known in the field of lens-fitted film unit.

On the front side of the body portion 3a, a front cover 3b is fixed. The front cover 3b is formed to cover almost all the front side of the body portion 3a, and comprises a finder window 27a aligning with the finder window 27 of the body portion 3a, a flash window 23d for exposing the light emitting portion 23a forward, a strobe switch opening 29c for exposing the switch knob 29a on the switch board 29 within the stroke range whereof in the front side of the body portion 3, and the lens opening 13b for allowing the cylindrical lens holding member 13a of lens holder 13 to pass through. On the front side of the front cover 3b, there is a reflective mirror 32 disposed at a side of the finder window 27a to serve as a reflective finder for use in observing a photographing field from front side of the front cover under a close-up photographing. In the illustrated form of embodiment, the reflective mirror 32 is formed of a polished metal plate. As shown in FIG. 2 and FIG. 3, the cylindrical lens holding member 13a extends forward through the lens opening 13b in the front cover 3b.

Figure 4:
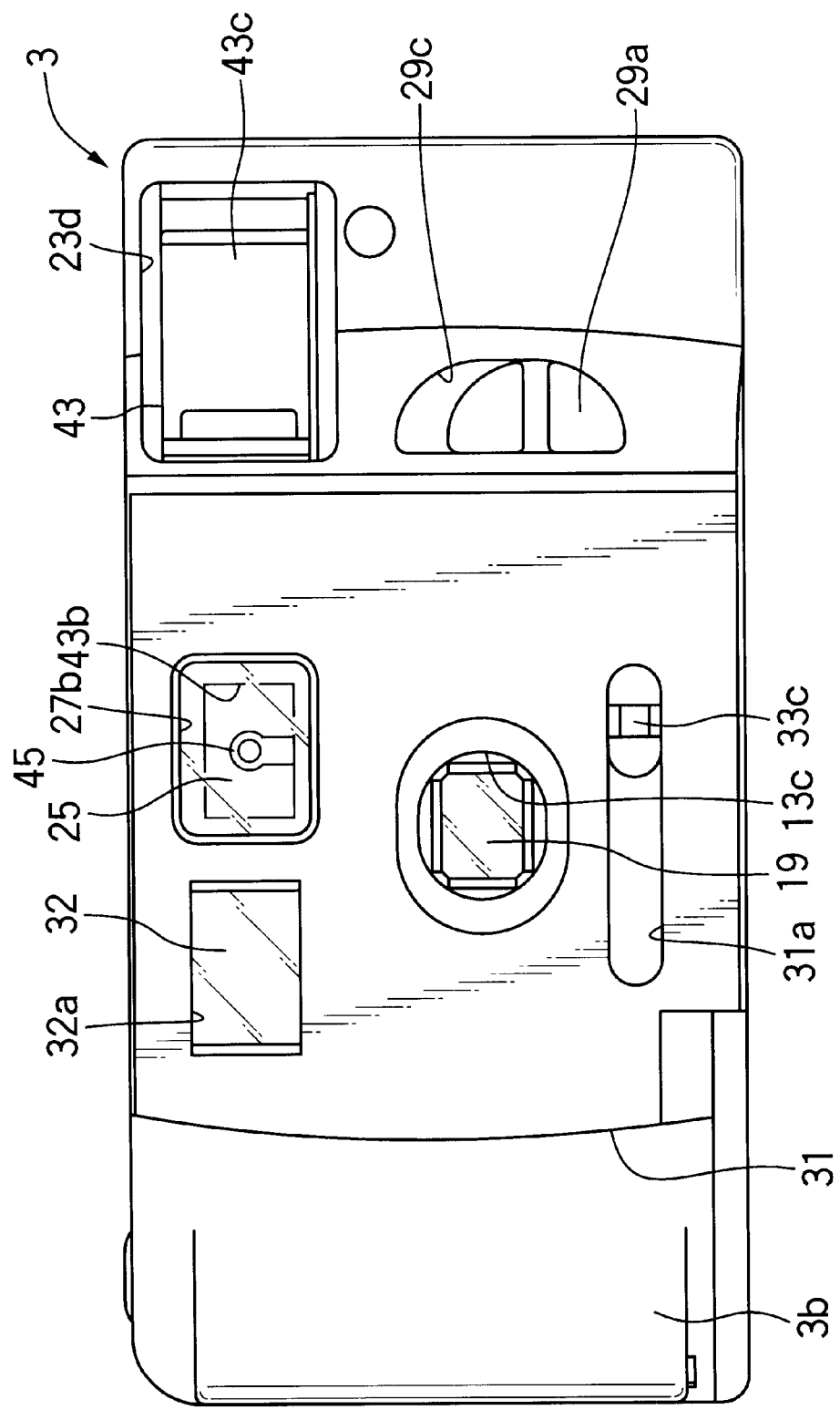
FIG. 4 is a front view of the lens-fitted film unit illustrated in FIG. 1 under a close-up photographing condition.

On the front side of the front cover 3b, an outer cover 31 is fixed. In the outer cover 31, a finder window 27b is formed to align with the finder window 27a in the front cover 3b. A window 32a is formed and aligned with the reflective mirror 32 so as to expose the reflective mirror 32 forward. Also in front of the cylindrical lens holding member 13a, a photographing exposure aperture 13c is provided to pass photographing light. Between the outer cover 31 and the lens holding frame 17, a coil spring 19a is located. The coil spring 19a has a first end engaged with the lens holding frame 17, and the other end with the inside of the outer cover 31 respectively, to urge the lens holding frame elastically toward the cylindrical lens holding member 13a. Between the outer cover 31 and the front cover 3b, there is located a selector member 33 which is movable sidewardly. FIG. 4 is a front elevational view of the lens-fitted film unit 1 according to the embodiment. As shown in FIG. 4, the reflective mirror 32 is located in the left side of the finder window 27 as seen toward the lens-fitted film unit 1, or in the right side as seen from the lens-fitted film unit 1 toward the object to be photographed.

Figure 5:
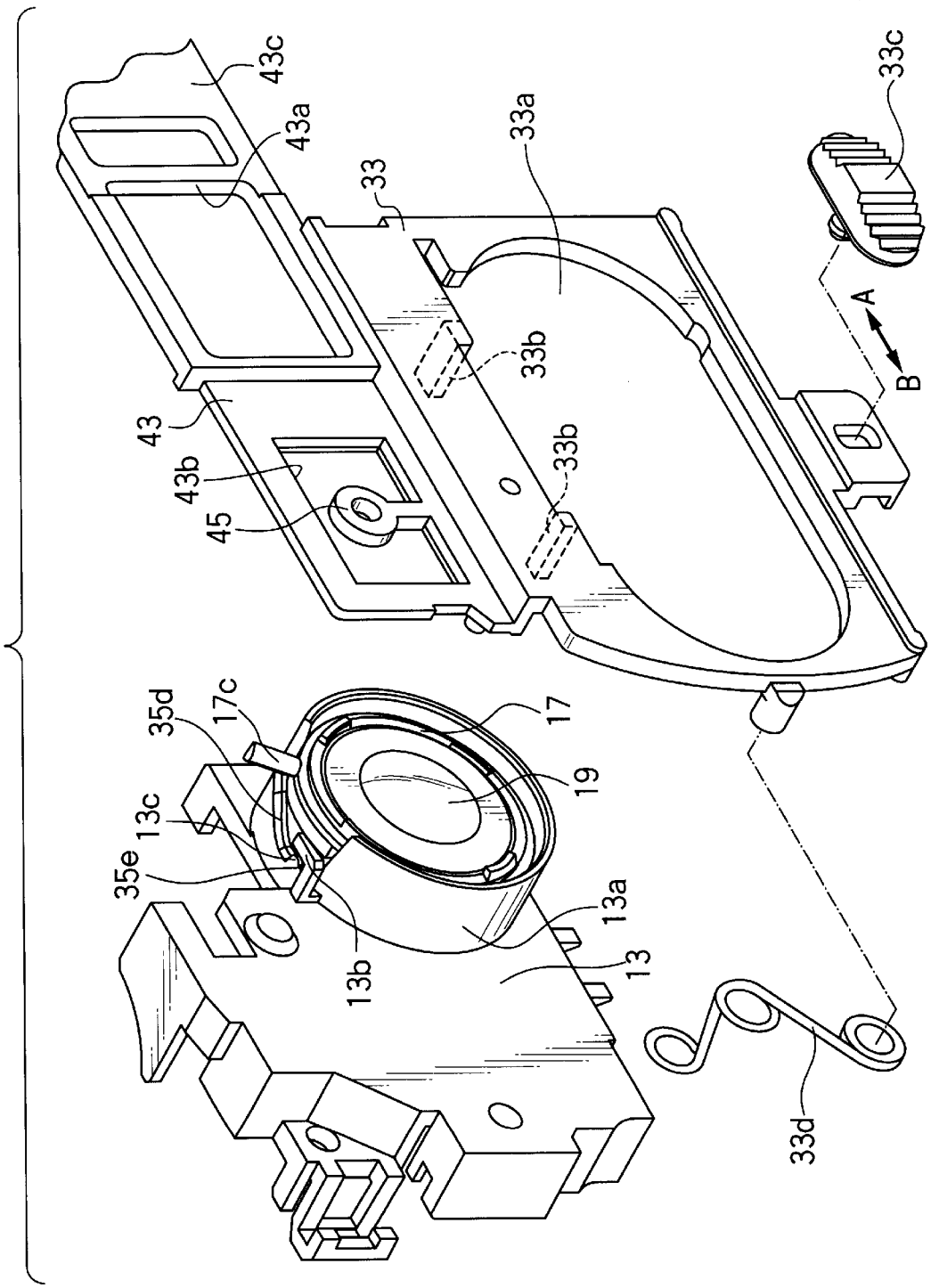
FIG. 5 is an exploded perspective view illustrating an arrangement of a selector member in a focus adjusting mechanism of the taking lens in one embodiment of the present invention.
Figure 6:
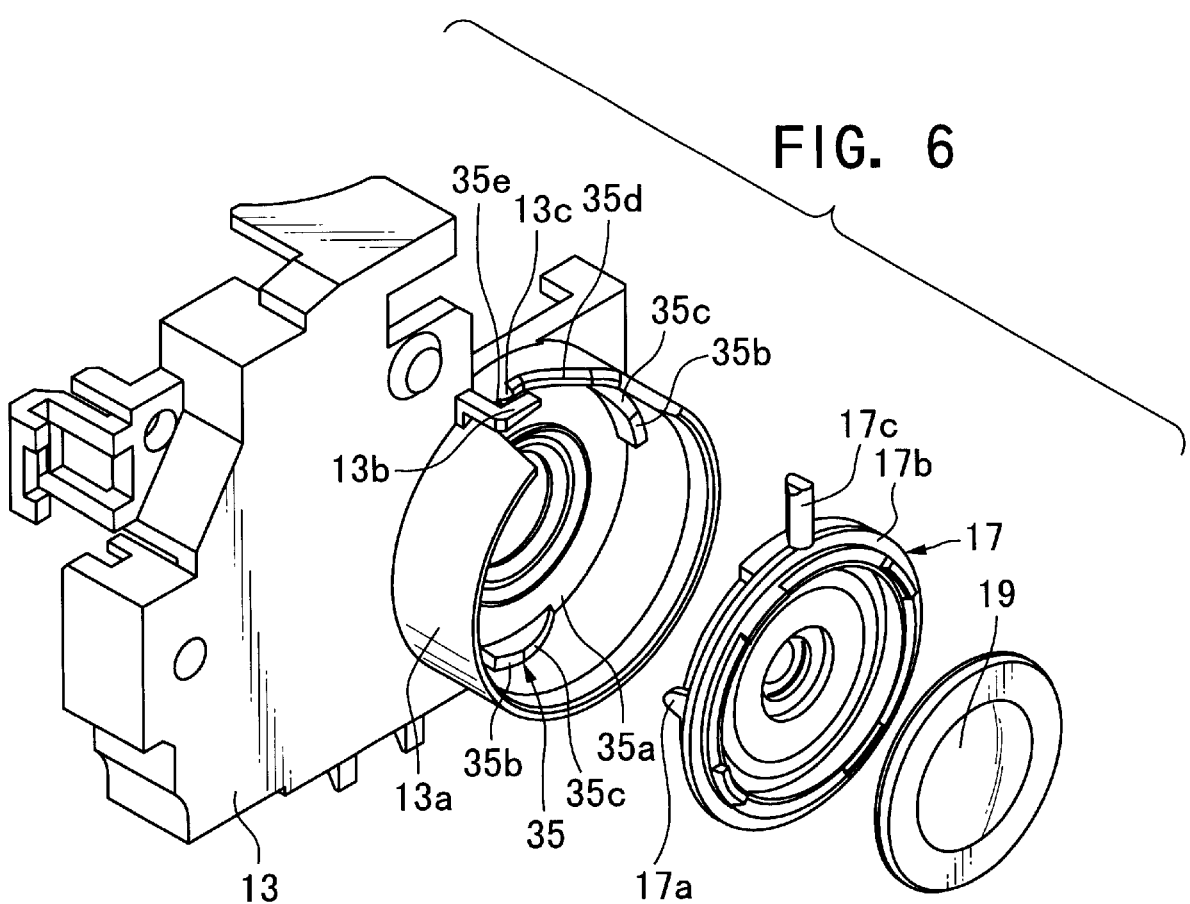
FIG. 6 is an exploded perspective view illustrating the focus adjusting mechanism of the taking lens in one embodiment of the present invention.

FIG. 5 and FIG. 6 illustrate the details of the focus adjusting mechanism of the taking lens embodying the present invention. The cylindrical lens holding member 13a extending from the lens holder 13 has a cam surface 35 facing the object. In the embodiment illustrated, the cam surface 35 is composed of the first surfaces 35a to define the retracted position of the taking lens 19, the second surface 35b to define the advanced position of the taking lens 19, and the slopes 35c to connect the first surfaces 35a and the second surfaces 35b. A plurality of such cam surface 35 are formed at a plurality of (for example 3) equi-spaced positions on the circumference of the cylindrical lens holding member 13a.

Figure 7:
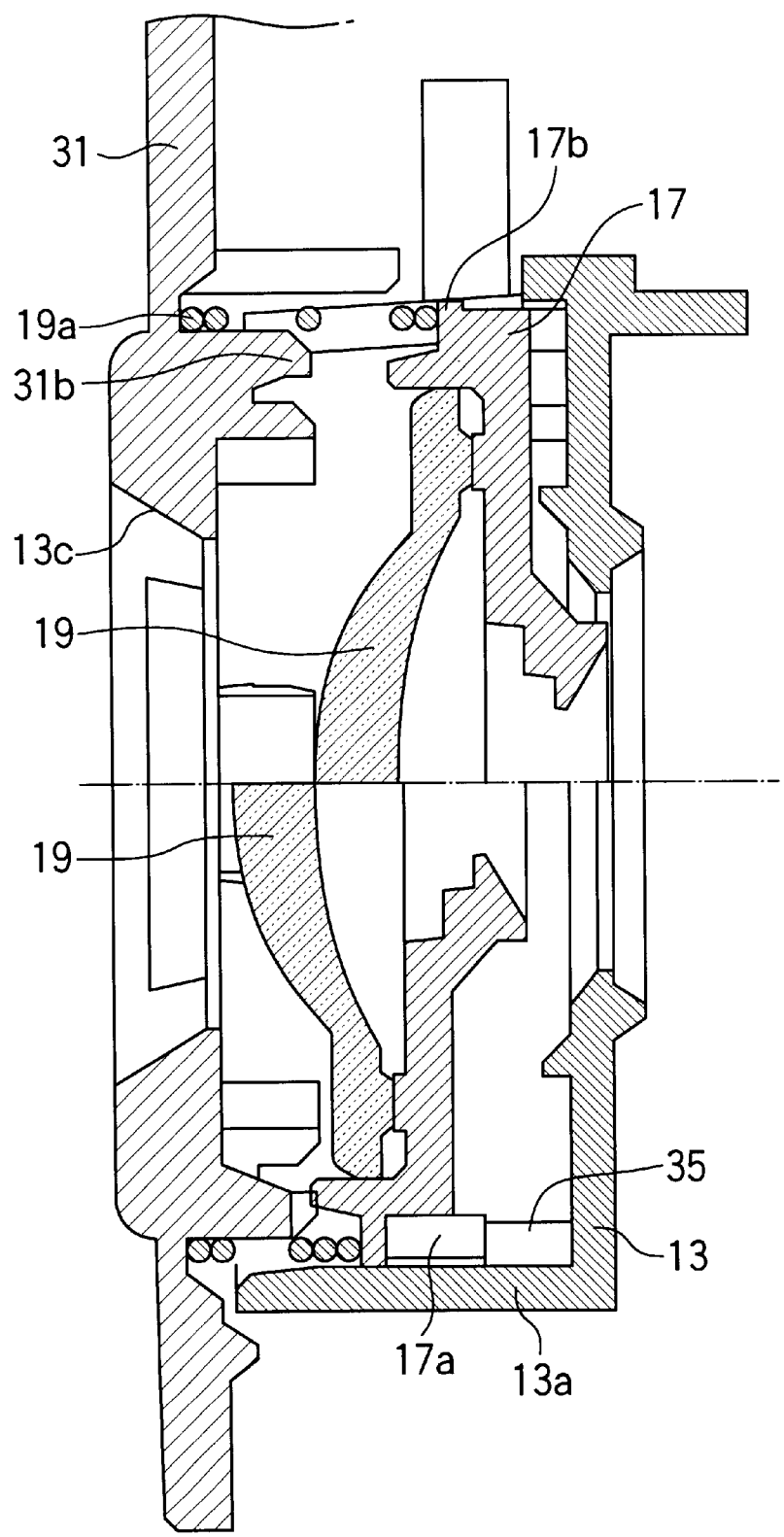
FIG. 7 is an enlarged sectional view of a supporting mechanism of the taking lens in one embodiment of the present invention.
Figure 8:
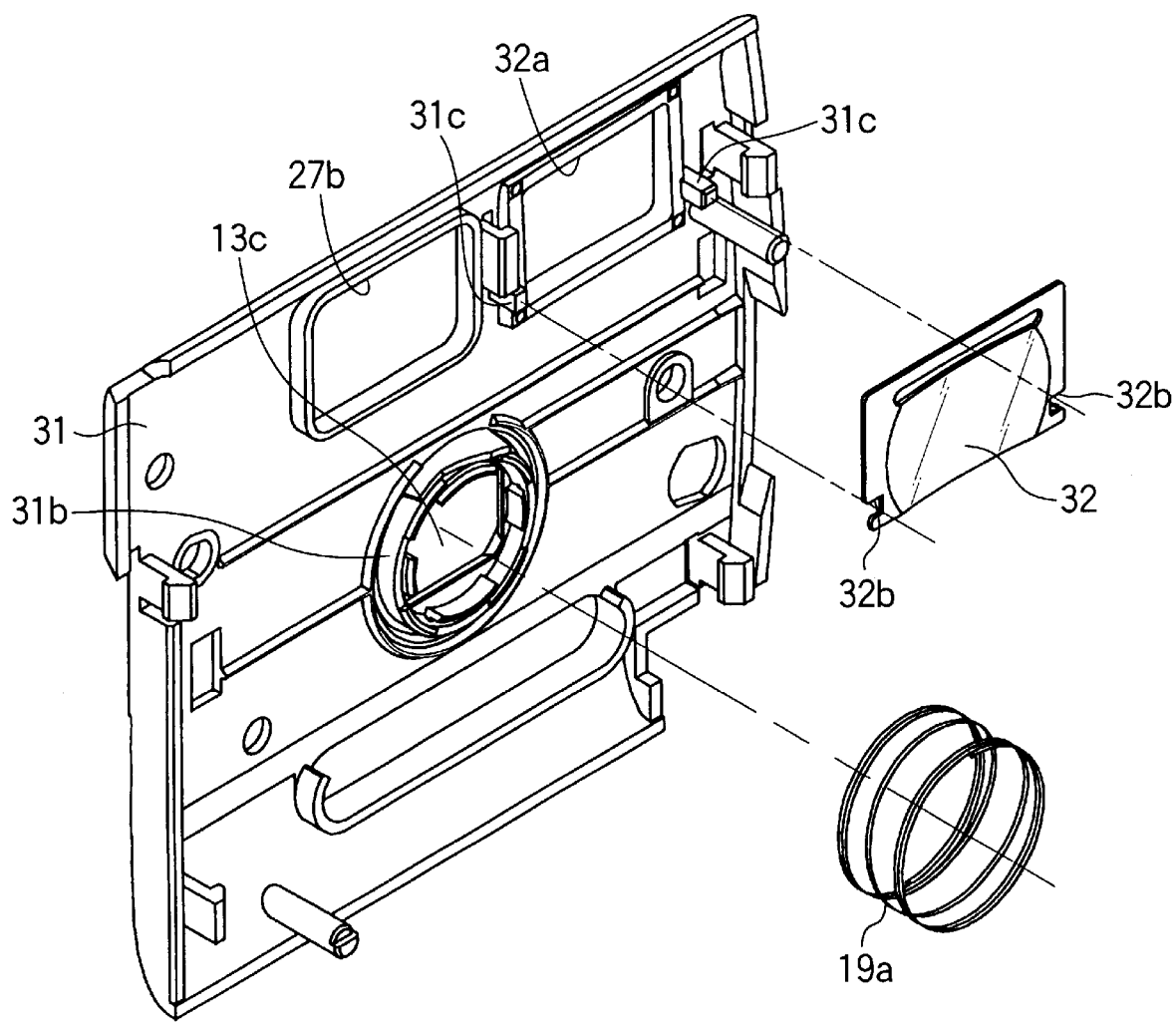
FIG. 8 is a perspective view looking at a front cover from behind to illustrate the attaching structure of a coiled spring for holding down the lens.

The lens holding frame 17 is formed to have a plurality of (for example 3) cam driven legs 17a projecting axially backwards. The cam driven legs 17a engage with the cam surfaces 35 of the cylindrical lens holding member 13a. The lens holding frame 17 is formed with a flat circular platform 17b on the front circumference, and on the circular platform 17b the backward end of the coil spring 19a sits. The cam driven legs 17a of the lens holding frame 17 are urged onto the cam surfaces 35 of the cylindrical lens holding member 13a resiliently by the coil spring 19a. FIG. 7 and FIG. 8 illustrate a structure for attaching the coil spring 19a. The outer cover 31 is formed with a substantially cylindrical spring support 31b surrounding photographing exposure aperture 13c and protruding backward from the back side, and the front end of the coil spring 19a is seated around the spring support 31b. The outer diameter of the spring support 31b is a little larger than the inner diameter of the end of the coil spring 19a. Therefore, the coiled spring 19a is attached around the spring support 31b with the end slightly expanded by the spring support 31b. By the constitution like this the coil spring 19a can temporarily be held on the outer cover 31 during assembly. The characteristics of this temporary hold bring about a merit to facilitate holding parts during assembly.

FIG. 8 also illustrates the way the reflective mirror 32 is attached to the outer cover 31. In the both sides of reflective mirror opening 32a formed in the outer cover 31, there are a pair of attaching pins 31c and the reflective mirror 32 is provided at the opposite sides on the circumference with a pair of cut-off portions 32b for receiving the pins 31c. The reflective mirror 32 is attached to the outer cover 31 by having the cut-off portions 32b of the reflective mirror 32 engaged with the attaching pins 31c.

Figure 9:
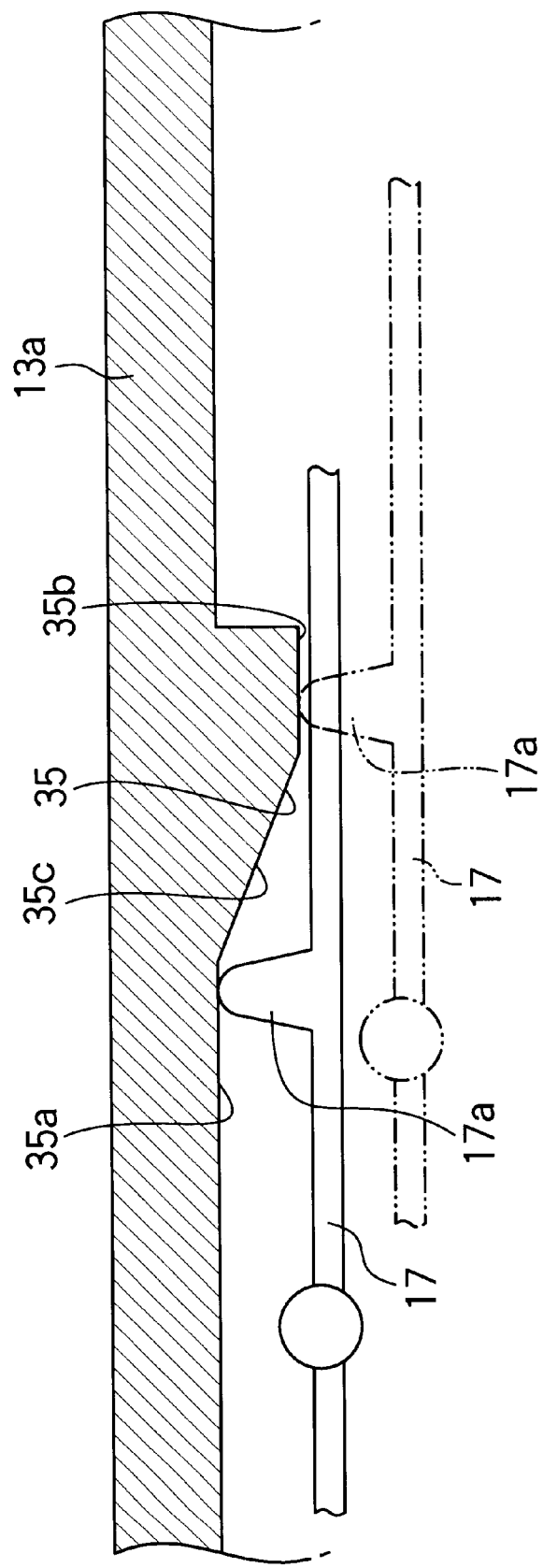
FIG. 9 is a development to illustrate a cam mechanism in the focus adjusting mechanism of the taking lens.

As shown in FIG. 5, the selector member 33 is in the form of a frame member provided with an opening 33a in the middle. The selector member 33 is located between the outer cover 31 and the front cover 3b in such a way that the cylindrical lens holding member 13a is inserted into the opening 33a. The lens holding frame 17 is provided with a driven pin 17c protruding radially upwardly. The selector member 33 is provided with a pair of lens driving pins 33b protruding backward, and between the lens driving pins 33b, the driven pin 17c on the lens holding frame 17 is located. In the lower portion of the selector member 33, there is a selector knob 33c formed to project through the slit 31a formed on the outer cover 31. Therefore, the selector member 33 can be moved in a transverse direction by operating the selector knob 33c. When the selector member 33 moves sideward, one of the lens driving pins 33b on the selector member 33 engages with the driven pin 17c on the lens holding frame 13a to rotate the lens holding frame 13a. By the rotation of the lens holding frame 13a, the cam driven legs 17a slide on the cam surface 35 to receive the action of the cam, and the lens holding frame 13a moves axially. This action of the cam is shown in an extended view in FIG. 9.

When the selector member 33 is on the light side position as seen in the direction facing the object, the cam driven legs 17a engage with the first cam surfaces 35a of the cam surface 35, and when the cam driven legs 17a are so positioned, the lens holding frame 13a and taking lens 19 are located in the retracted position, thus bringing the taking lens 19 to the normal position wherein the taking lens is focused at a distant position, for example 4 meters. On the contrary, when the selector member 33 is on the left as seen in the direction facing the object, the cam driven legs 17a are brought to be on the second cam surfaces 35b of the cam surface 35, whereby the lens holding frame 13a and taking lens 19 are advanced to the advanced position, to bring the taking lens 19 to the close-up photographing position wherein the taking lens is focused at a close position, for example 60 cm.

A slanting guide surface 35d is formed in an upper portion on the front of the cylindrical lens holding member 13a to guide the follower pin 17c. The pair of lens driving pins 33b formed on the selector member 33 are located at a predetermined distance along the direction of the movement of the selector member 33. The distance between the lens driving pins 33b is so designed as to be larger than the diameter of the driven pin 17c on the lens holding frame 13a. When the selector member 33 is moved to the right as seen from front to rear, or in the direction of the arrow A in FIG. 5, the driven pin 17c is moved along the slanting guide surface 35d, by the left one as seen from front to rear of the lens driving pins 33b, from right to left. When the selector member 33 reaches the right end of the stroke as seen from front to rear, the right one of the lens driving pins 33b is located at a position apart from the driven pin 17c by the predetermined distance corresponding to the distance between the pair of lens driving pins 33b. The relation between the lens driving pins 33b and the driven pin 17c is shown by solid line in FIG. 10.

Figure 10:
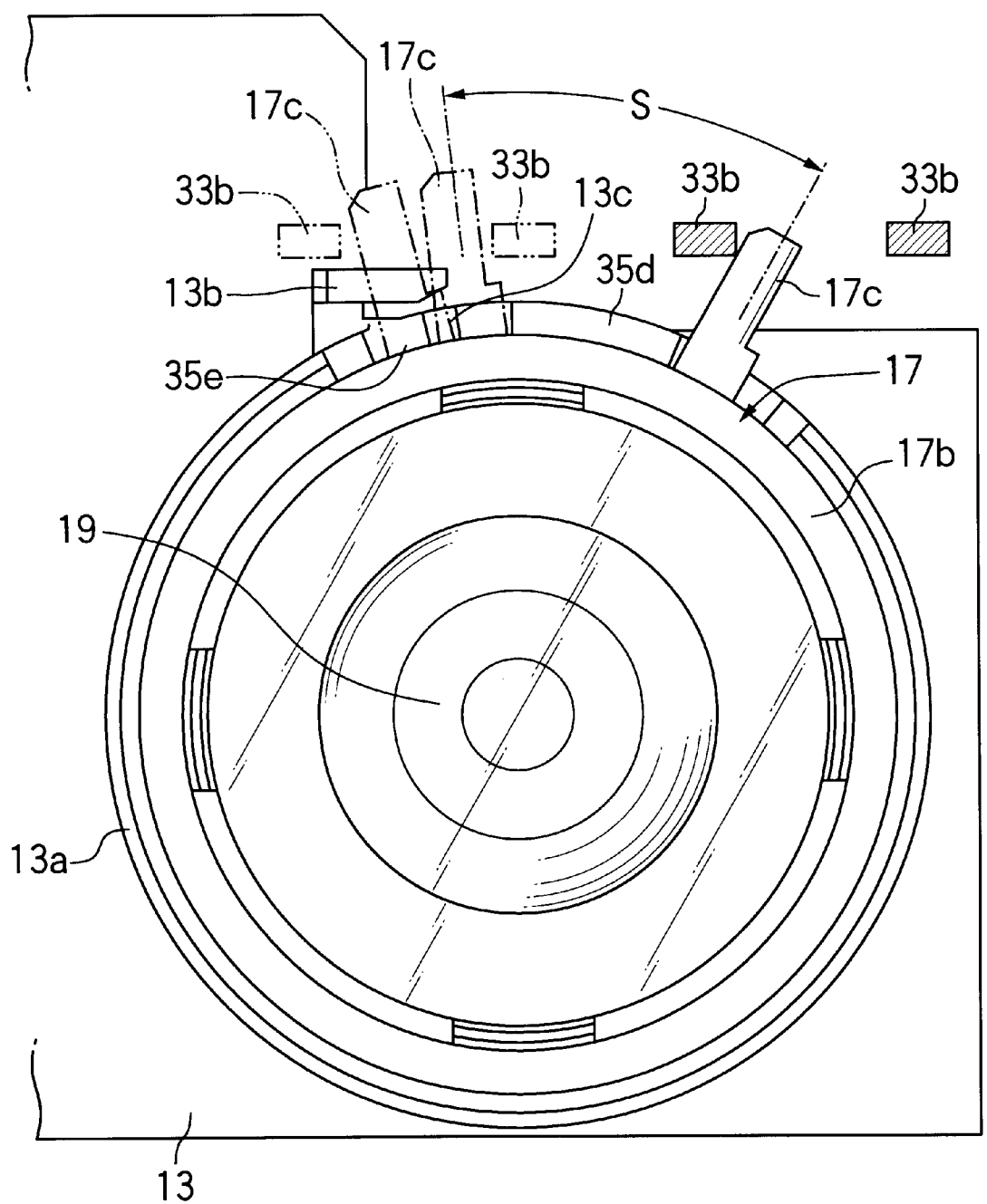
FIG. 10 is a front view illustrating the focus adjusting mechanism of the taking lens of one embodiment of the present invention.

When the selector member 33 moves in the opposite direction, the left side one as seen from front to rear of the lens driving pins 33b does not contact the driven pin 17c until the selector member 33 has moved to the left by the aforementioned predetermined distance. This portion of the stroke provides a lost-motion for the selector member 33 in starting. After the selector member 33 has moved throughout this lost-motion portion of the stroke, the right side one of the lens driving pins 33b engages with the driven pin 17c and drives the pin leftwards to the end of the stroke of the selector member 33. The geometrical relation between the selector member 33 and the driven pin 17c is shown in FIG. 10 with dash and dotted line. As shown in FIG. 10, the stroke S of the driven pin 17c is smaller than that of the selector member 33 by the length corresponding to the space between the pair of lens driving pins 33b.

Figure 11:
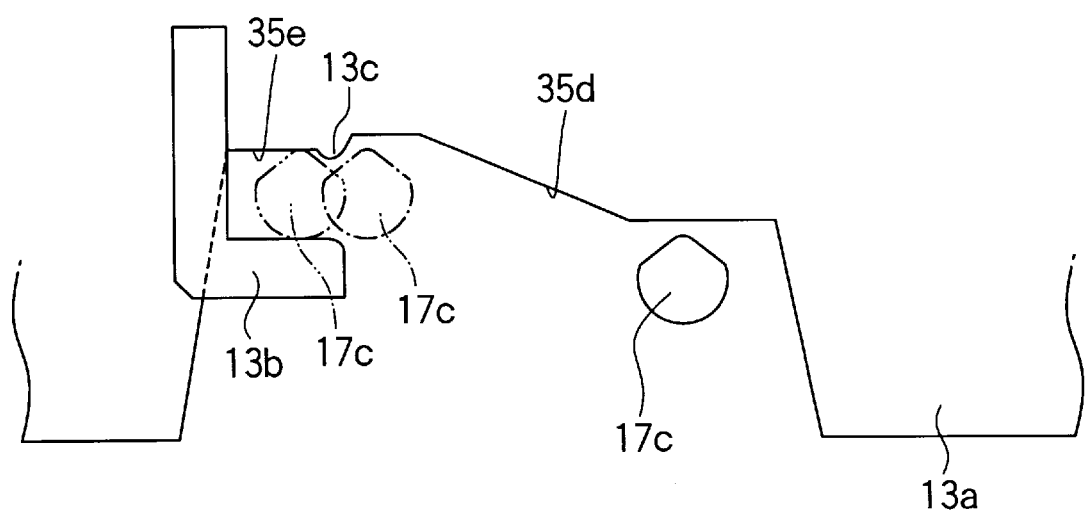
FIG. 11 is a schematic diagram illustrating movement of driven pins in the focus adjusting mechanism of the taking lens in one embodiment of the present invention.
Figure 12:
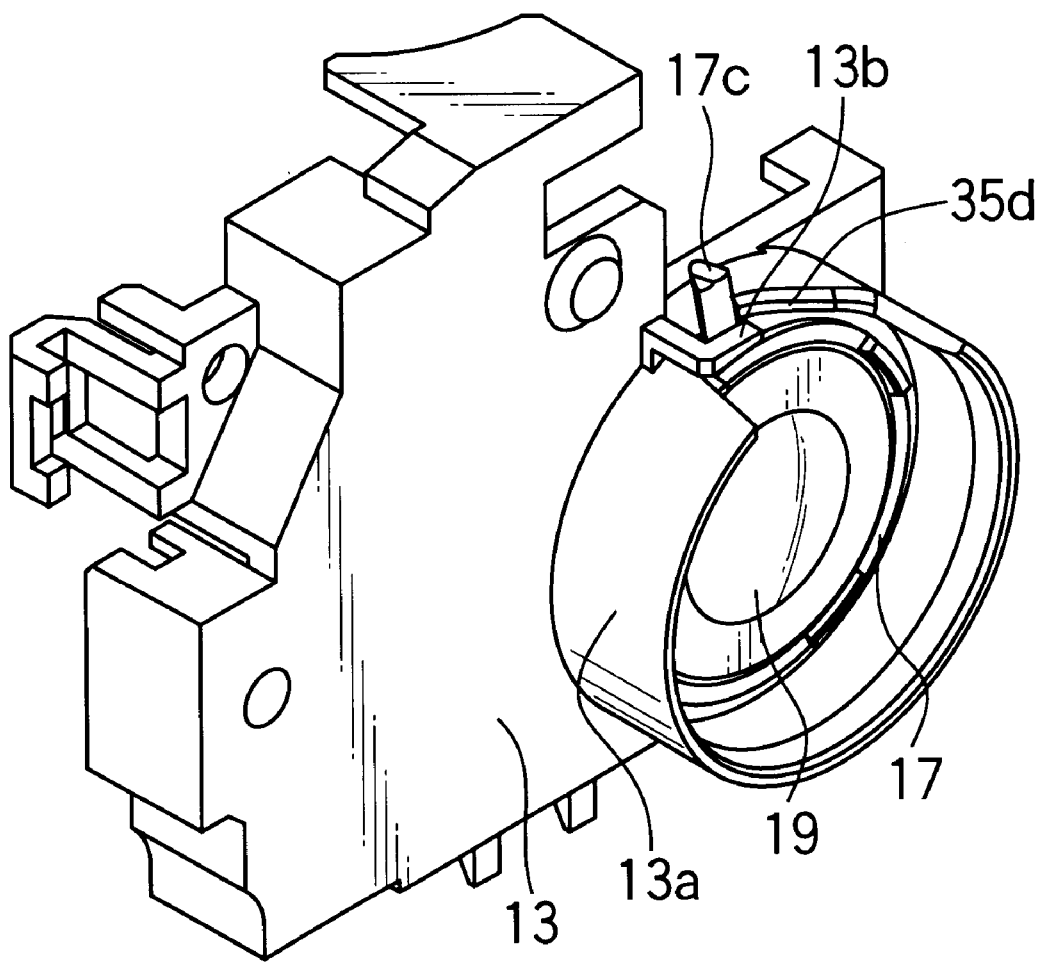
FIG. 12 is a perspective view illustrating a state of the focus adjusting mechanism of the taking lens in assembly.

In assembly, the driven pin 17c can be held out of the range of the operation stroke S. The above mentioned position is shown by dash and double dotted line in FIG. 10. In order to temporarily retain the driven pin 17c, a cylindrical lens holding member 13a is provided with a resilient holding arm. The holding arm 13b is formed to be opposed to a flat portion 35e of the cylindrical lens holding member 13a with a predetermined distance therebetween the cylindrical lens holding member 13a being formed on the side opposing to the holding arm 13b with a temporarily holding click 13c. When the driven pin 17c is at the position indicated by the dash and double doted line in FIG. 10, the driven pin 17c is at the position indicated by (a) in FIG. 11, and is kept between the holding arm 13b and the click 13c as shown in FIG. 12. In this state, the lens holding frame 17 is maintained on the cylindrical lens holding member 13a and can be transferred to an assembly site.

In this position, the driven pin 17c is between the paired lens driving pins 33b, and when the selector member 33 is first moved after the assembly the driven pin 17c is driven by the lens driving pins 33b on the left side as seen from front to rear to be released from the restriction between the holding arm 13b and the click 13c, as shown by the dash and double doted line in FIG. 10. Thereafter, the driven pin 17c moves for a smaller stroke than that of the selector member 33 as mentioned above, so that the driven pin 17c does not come under the holding arm 13b.

In the illustrated embodiment of the present invention, as shown in FIG. 1 and FIG. 5, a finder frame 43 is formed integrally with the selector member 33 on the top whereof. The finder frame 43 is formed with an opening 43a transversely central portion so that it is aligned with the finder window 27 of the body portion 3a of the unit body 3 in the normal photographing condition wherein the selector member 33 is shifted to the right as seen toward the object. On the right of the opening 43a as seen toward the object, a close-up field frame 43b is formed to indicate the photographing field in with respect to the opening 43a, there is a light limiting portion 43c that covers the light emitting portion 23a except for the both ends of the light emitting portion 23a when the selector member 33 is at the position of close-up photographing. This finder frame 43 moves transversely along the front side of the front cover 3b between the front cover 3b of the body portion 3 and the outer cover 31 in response to the transverse movement of the selector member 33.

Figure 13:
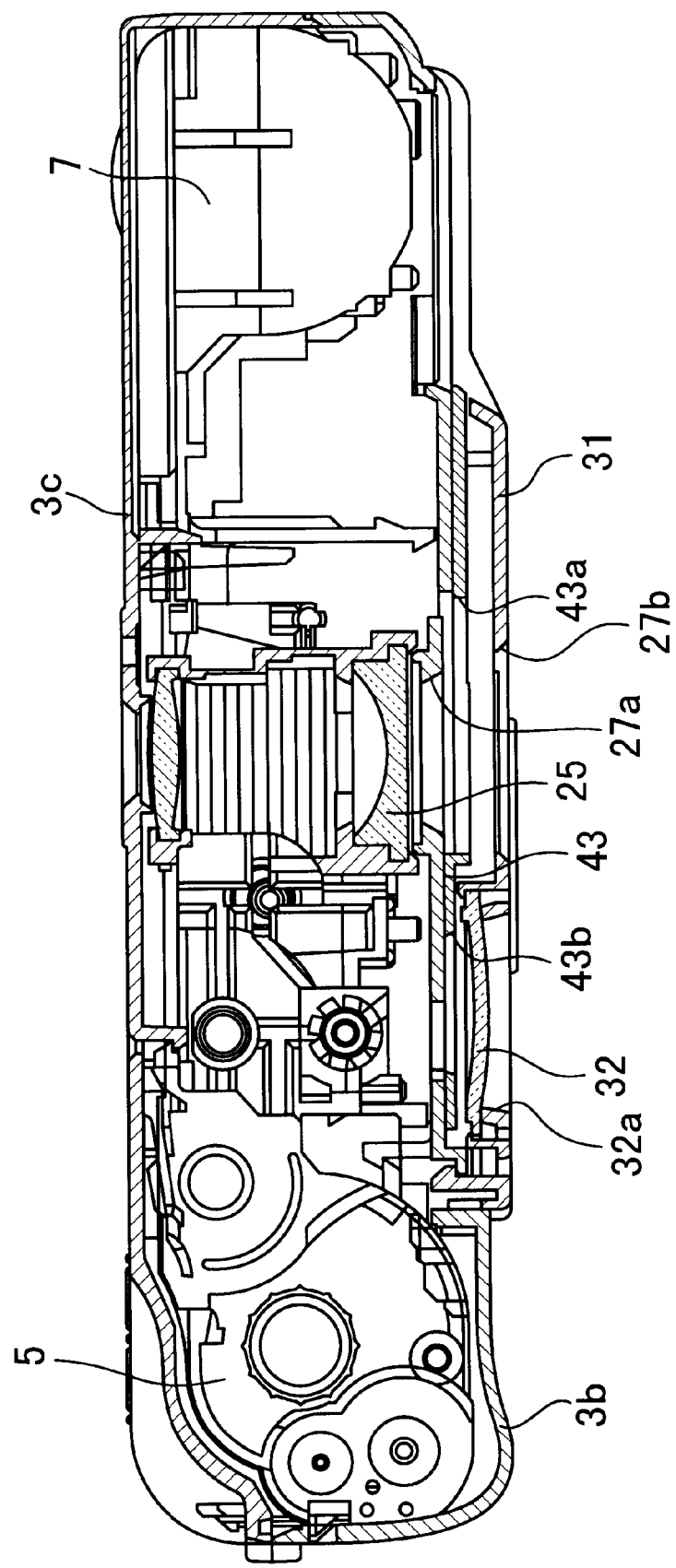
FIG. 13 is a horizontal sectional view illustrating a finder mechanism in one embodiment of the present invention.

FIG. 13 is a transverse cross-section to illustrate the location of the finder frame 43 when the selector member 33 is in the normal photographing position, and FIG. 8 is a front view. The opening 43a of the finder frame 43 is aligned with the finder window 27a of the front cover 3b, and the photographer looks at the object through the finder objective lens 25 fixed to the finder window 27 to determine the filed of photographing. At that time, the light limiting portion 43c of the finder frame 43 is between the light emitting portion 23a and the finder window 27, and the light emitting portion 23a is totally exposed. Also, the close-up field frame 43b of the finder frame 43 is on the backside of the reflective mirror 32.

Now, in case where the selector member 33 is move to the left as seen toward the object, as mentioned before, the taking lens 19 is advanced to the close-up photographing position, and at the same time, the finder frame 43 moves to the same direction to the position illustrated in FIG. 4. At this position the close-up field frame 43b enters the finder window 27b, and the photographer can check the range of close-up photographing by way of the close-up field frame 43b. Also, when a photographer is to take a self-portrait in the photographing range, the photographer can check the photographing range by the reflective mirror 32 from the front side of the lens-fitted film unit 1. Moreover, in this close-up photographing position, the light limiting portion 43c formed in the finder frame 43 is positioned in front of the flash window 23d of the front cover 3b, covering almost all of the flash unit 23 except for the both sides thereof, so that the light from the flashing unit is emitted only from the both sides of the light limiting portion 43c, thus the quantity of the emitted light is limited. Therefore, by this construction the overexposure in close-up photographing can be avoided. In the present embodiment, a target mark 45 is provided in the close-up field frame 43b to provide a target in close-up photographing. The target mark 45 is to show the central part of the photographing range in close-up photographing to the photographer.

Figure 14:
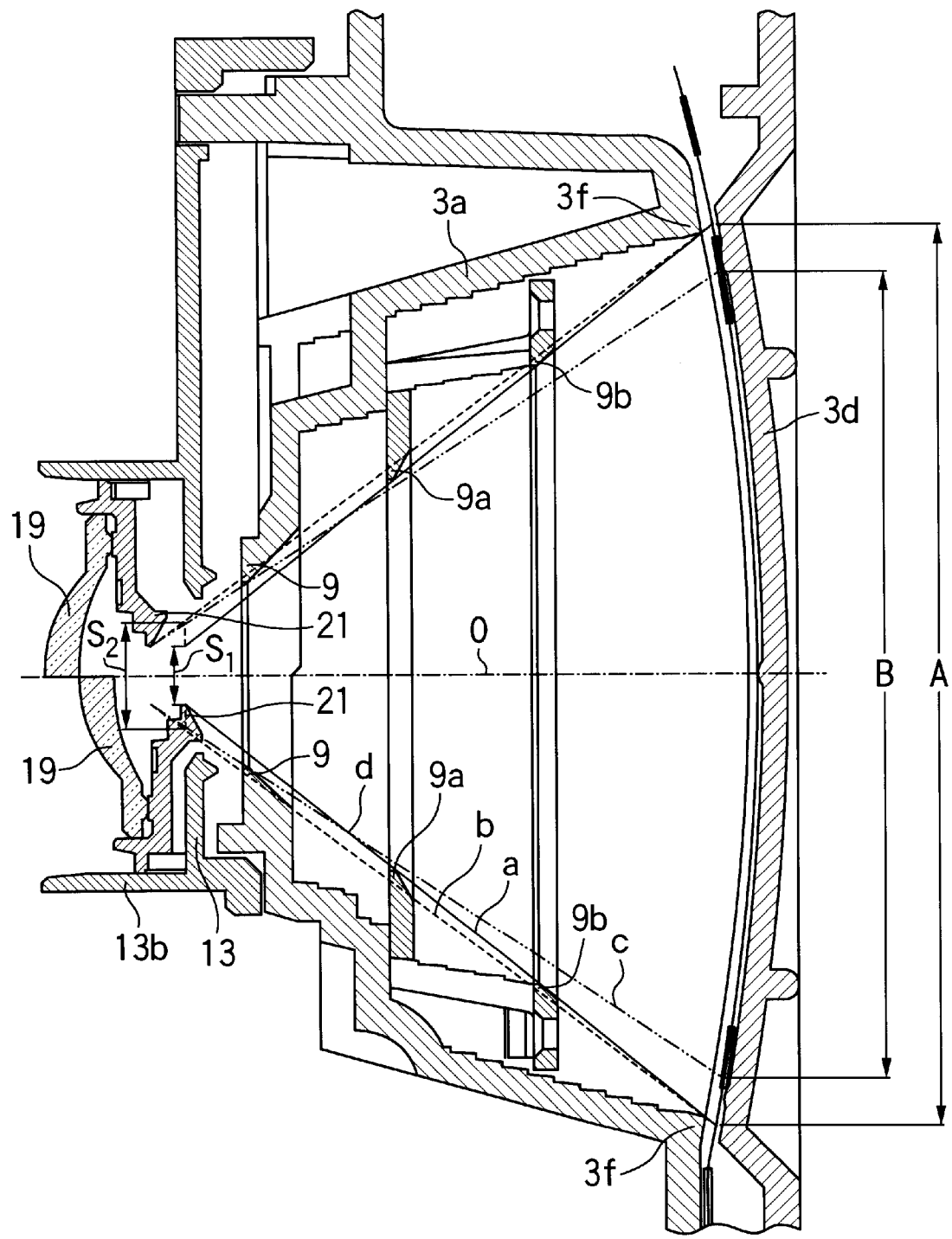
FIG. 14 is a horizontal sectional view illustrating a detail of photographing optical system and a arrangement of making frames.
Figure 15:
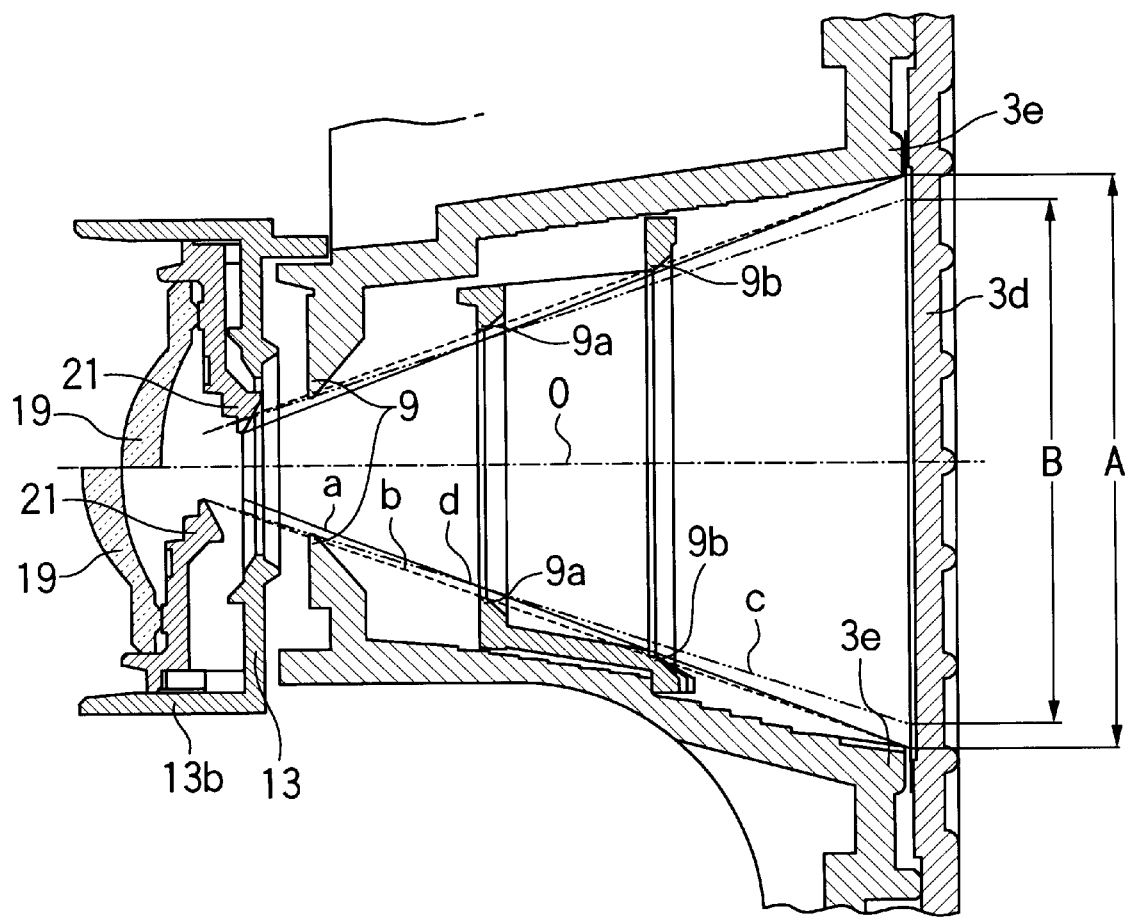
FIG. 15 is a vertical sectional view illustrating the details of the photographing optical system and the layout of the making frames.

FIGS. 14 and 15 show respectively an enlarged horizontal sectional view and an enlarged vertical sectional view illustrating the photographing optical system of the lens-fitted film unit. The film holder 3d of the rear cover 3c positions the photo film at an imaging surface. The film support 3e formed on an upper and lower portions of the rear side of the body portion 3a and side frames 3f formed at the opposite sides of the body portion 3a defines an exposure frame which defines the exposure area A on a film surface. The exposure aperture 9 formed on the body portion 3a constitutes a making frame.

Figure 16:
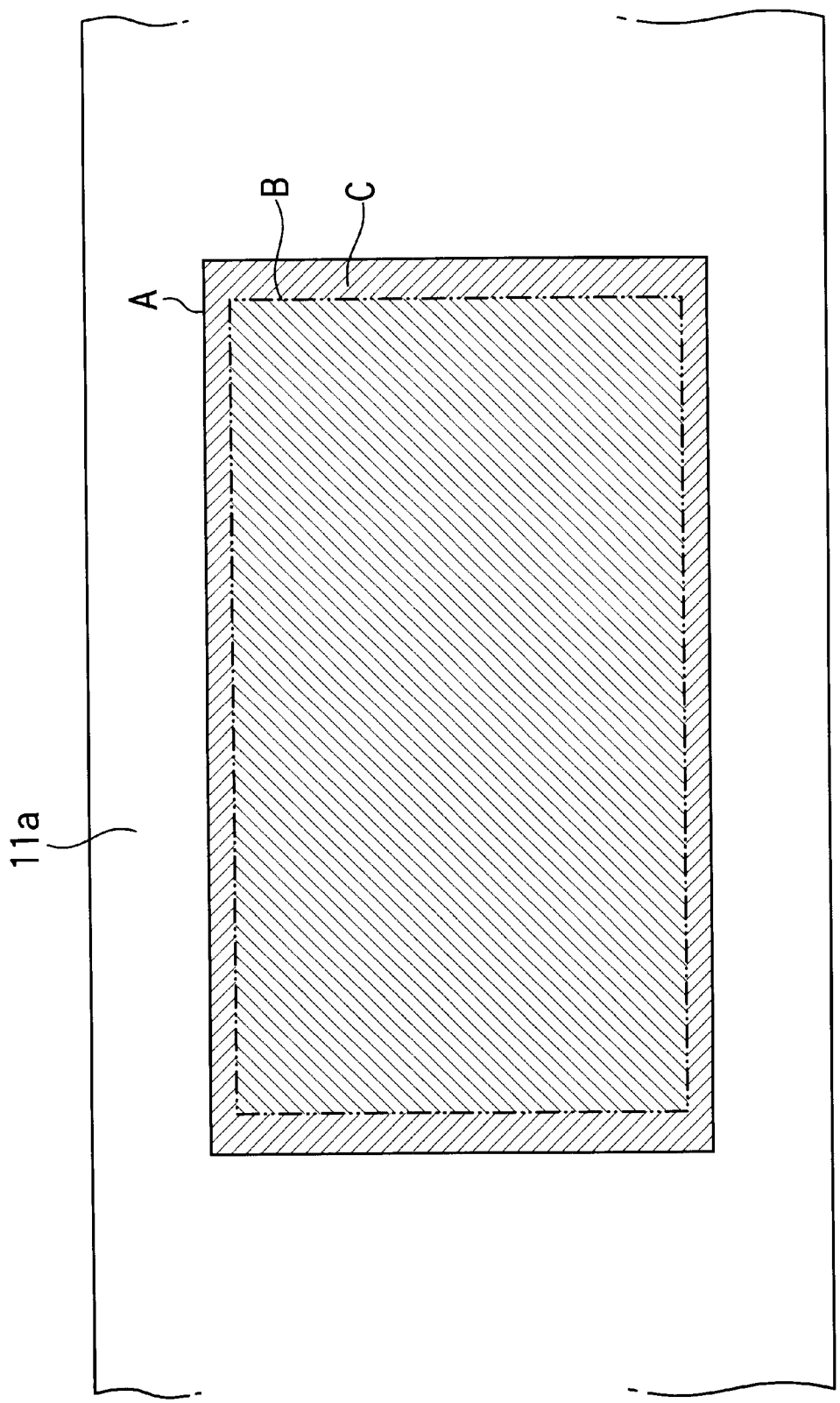
FIG. 16 is a front view illustrating an exposure area and a print area in a photo taking film.

In FIG. 16, the exposure area A and the print area B of film 11a are shown. The area C outside the print area B in the exposure area A is a non-print area.

As for APS films, the exposure area A and the print area B are regulated by the "Red Book" standards. In 135 type films, an exposure area is regulated as a picture size by the ISO standards, while no provision is made with respect to the print area. In this case, there are, however, recommended print magnifications for each photographic paper size, so the print area can be determined by calculating back from this recommended print magnifications. Other proper methods can also be applied for determining the print area In FIG. 14, the lower side of the centerline O representing the optical axis shows a state in which the taking lens 19 is located at the retracted position. In FIG. 15, the upper side of the centerline O shows a state in which the taking lens 19 is located at the retracted position. In this position, the light path which extends between the edge of the taking lens aperture 21 and the outer peripheral potion of the exposure area A is indicated as "a". The advanced position of the taking lens 19 is shown on the upper side of the center line O in FIG. 14 and the lower side of the center line O in FIG. 15, respectively. In this position of the taking lens 19, the light path which extends between the edge of the taking lens aperture 21 and the outer peripheral portion of the exposure area A is indicated as "b". These light paths "a" and "b" mean the outermost photographing light in the advanced position of the taking lens 19. Further, in the advanced position of the taking lens 19, the light path which extends between the edge of the taking lens aperture 21 and the inner peripheral portion of the print area B is indicated as "c". The angular field defined by the light path "b" in the advanced position of the taking lens 19 is smaller than the angular field defined by the light path "a" in the retracted position. The light path "c" running into the edge of the print area in the advanced position of the taking lens 19 and the light path "a", in the retracted position of the taking lens 19, crosses at the intersection "d".

The exposure aperture 9 of the body portion 3a forming the making frame is positioned at the side adjacent to the taking lens aperture 21 with respect to the intersection "d" of the light paths "a" and "c". The size of this exposure aperture 9 is substantially matched with the light path "c". Thus, the exposure aperture 9 allows the photographing light within the print area B to pass through, while it partly blocks the photographing light directed to the non-print area C outside the print area, in the advanced position of the taking lens 19. The exposure aperture 9 may be slightly larger than the illustrated one to allow the photographing light directed to the non-print area C to partly pass through.

Since the light path "a" of the photographing light in the advanced position of the taking lens 19 is positioned inside the exposure aperture 9, the light directed to the area outside the exposure area A through the taking lens aperture 21 can be passed through the exposure aperture 9. However, since the size of the exposure aperture 9 is adapted to block at least a part of the light directed to the non-print area C in the advanced position of the taking lens 19, the quantity of light directed to the area outside the exposure area A through the exposure aperture 9 in the retracted position of the taking lens 9 is also decreased as much as the quantity which is blocked by the exposure aperture. Therefore, even in the retracted position of the taking lens 19, ghost images and flare spots caused by internal reflection can be suppressed to a certain extent by the exposure aperture 9.

In this embodiment of the present invention, two fixed making frames 9a and 9b are also provided at the side adjacent to the film surface with respect to the exposure aperture 9 with a space therebetween in the direction of the optical axis. As seen in FIG. 14, the making frames 9a and 9b are configured at the transversely opposite sides of the photographing light to have dimensions which substantially match with the light path a directed to the outer peripheral portion of the exposure area A in the retracted position of the taking lens 19. In addition, these making frames 9a and 9b allow the whole light directed to the print area B to pass through without blocking the light path "c" in the advanced position of the taking lens 19. Further, as shown in FIG. 15, the fixed making frame 9b is configured at the upper and lower sides of the photographing light to have a dimension which substantially matches with a light path a directed to the outer peripheral portion of the exposure area A in the retracted position of the taking lens 19. Therefore, harmful lights caused by internal reflection in the retracted position of the taking lens 19 can be substantially blocked by providing these making frames 9a and 9b.

As seen in FIGS. 14 and 15, moving the taking lens 19 and the aperture 21 in the direction of the optical axis is synonymous with varying the diameter of the aperture disposed at a predetermined position in the direction of the optical axis. That is, for example, in FIGS. 14 and 15, an aperture may be provided immovably in the direction of the optical axis at the position of the taking lens aperture 21 in the retracted position of the taking lens 19 and the aperture size may be changed between $S_1$ and $S_2$ as shown in FIG. 14 to obtain the same result. Moving the taking lens 19 from the retracted position to the advanced position is synonymous in effective with having the f-number changed from $S_1$ to $S_2$. Accordingly, the present invention can be applied to optical systems where f-numbers of the taking lens aperture are variable as well as optical systems in which the taking lens is adapted to move in the direction of an optical axis. In this case, any known technology can be adopted for the aperture adjusting structures.

What is claimed is:

1. A lens-fitted film unit including:

a taking lens;

a photographic lens aperture provided in association with said taking lens;

a unit body having a photographing mechanism including a shutter, said unit body having a cartridge chamber for storing a cartridge shell having a rotatable spool attached with an end of a photo-film strip and a film roll chamber for storing a roll of unexposed photo-film withdrawn out of the cartridge shell, wherein said cartridge shell and said roll of unexposed photo-film withdrawn out of said cartridge shell are charged during manufacture in said cartridge chamber and said film roll chamber, respectively, a portion of said unexposed film being positioned by an exposure frame which defines an exposure area between said film roll chamber and said cartridge chamber, said spool being adapted to be rotated to take up an exposed film portion into the cartridge each time a photograph is taken; and a fixed making frame disposed between the taking lens aperture and the exposure frame so as to block a peripheral light, said taking lens aperture having a variable effective diameter to define an angular field of photographing light which extends from said taking lens aperture to said exposure area, the angular field being smaller under a larger effective diameter than under a smaller effective diameter, a predetermined width of a peripheral portion of said exposure area defining a non-print area, said fixed making frame being disposed at a side adjacent to said taking lens aperture with respect to an intersection between a peripheral light which extends between an inner periphery of said non-print area and said taking lens aperture, under said larger effective diameter of said taking lens aperture, and a peripheral exposure light which extends between said taking lens aperture and an outer periphery of said exposure area, under said smaller effective diameter of said taking lens, said making frame being configured to block at least a part of said photographing light outside said peripheral light which extends between said inner periphery of said non-print area and said taking lens aperture, under said larger effective diameter of said taking lens.

2. A lens-fitted film unit as claimed in claim 1, wherein said effective diameter of said taking lens aperture is defined by determining a position of said taking lens in the direction of an optical axis.

3. A lens-fitted film unit as claimed in claims 2, wherein said taking lens is of a fixed focal distance type, the movement of said taking lens in the direction of said optical axis being adapted to change a focus adjustment position.

4. A lens-fitted film unit as claimed in claims 2, wherein said taking lens is of a variable focal distance type, and the movement of said taking lens in the direction of said optical axis being adapted to change a focal distance.

5. A lens-fitted film unit as claimed in claims 1, wherein the effective diameter of said taking lens aperture is varied by changing said aperture diameter of said taking lens aperture.

6. A lens-fitted film unit as claimed in claim 1, further comprising a second making frame provided at a side adjacent to the film surface with respect to said intersection of said lights, said second making frame being configured to block the photographing light outside the peripheral exposure light, which extends between said outer peripheral portion of said exposed area and said taking lens aperture, under said smaller effective diameter of said taking lens.

7. A lens-fitted film unit including;

a taking lens having fixed focal distance;

a photographic lens aperture having a fixed aperture diameter and provided in association with said taking lens;

a unit body having a photographing mechanism including a shutter, said unit body having a cartridge chamber for storing a cartridge shell having a rotatable spool attached with an end of a photo-film strip and a film roll chamber for storing a roll of unexposed photo-film withdrawn out of the cartridge shell, wherein said cartridge shell and said roll of unexposed photo-film withdrawn out of said cartridge shell are charged during manufacture in said cartridge chamber and said film roll chamber, respectively, a portion of said unexposed film being positioned by an exposure frame which defines an exposed area between said film roll chamber and said cartridge chamber, said spool being adapted to be rotated to take up an exposed film portion into the cartridge each time a photograph is taken; and a fixed making frame disposed between the taking lens aperture and the exposure frame so as to block a peripheral light, said taking lens being movable in the direction of an optical axis between an advanced position and a retracted position for changing a focus adjustment position defining an angular field of a photographing light which extends from the lens aperture to an outer periphery of said exposure area, said angular filed being smaller when said taking lens is located at said advanced position than that when said taking lens is located at said retracted position, a predetermined width of a peripheral portion of said exposure area defining a non-print area, said fixed making frame being disposed at a side adjacent to said taking lens aperture with respect to an intersection between a peripheral light, which extends between an inner periphery of said non-print area and said lens aperture, in said advanced position of said taking lens, and a peripheral exposure light which extends between said lens aperture and an outer periphery of said exposure area in said retracted position of said taking lens, said making frame being configured to block at least the photographing light outside the peripheral light which extends between said inner periphery of said non-print area and said taking lens aperture in said advanced position of said taking lens.

\* \* \* \* \*